United States Patent [19]
Richardson

[11] Patent Number: 4,660,937
[45] Date of Patent: Apr. 28, 1987

[54] DICHROIC DYE-NEMATIC LIQUID CRYSTAL MIRROR

[75] Inventor: Kenneth J. Richardson, Hudson, Ohio

[73] Assignee: Crystaloid Electronics Company, Hudson, Ohio

[21] Appl. No.: 623,976

[22] Filed: Jun. 25, 1984

[51] Int. Cl.[4] .................................................. G02F 1/13
[52] U.S. Cl. ...................................... 350/349; 350/338
[58] Field of Search ...................... 350/349, 352, 331 R

[56] References Cited

U.S. PATENT DOCUMENTS 4,029,392  6/1977  Moriyama et al. .................. 350/349
4,274,713  6/1981  Krueger .......................... 350/349 X
4,483,593  11/1984 Imazeki et al. ..................... 350/349

*Primary Examiner*—John K. Corbin
*Assistant Examiner*—Richard F. Gallivan
*Attorney, Agent, or Firm*—Oldham, Oldham & Weber Co.

[57] ABSTRACT

A dichroic dye-containing nematic liquid crystal mirror has a photocell connected thereto to automatically change, that is, to dim or brighten, the mirror upon exposure to light. Under the preferred operating conditions, the mirror functions as an ordinary mirror but is dimmed by light. The invention is especially suited for the rearview mirror of an automobile.

20 Claims, 5 Drawing Figures

DICHROIC DYE-NEMATIC LIQUID CRYSTAL MIRROR

TECHNICAL FIELD

The present invention relates to an automatic dimmable or brightenable mirror upon exposure to light. More specifically, the present invention relates to the mirror assembly having a liquid crystal therein of negative or positive dielectric anisotropy material and a dichroic dye therein.

BACKGROUND ART

Heretofore, in the field of liquid crystals, any mirror utilizing a liquid crystal display was used in association with polarized members. An electric current was applied to the twisted nematic liquid crystal which rotated and caused reflected light to be dimmed. Structures of this type are set forth in U.S. Pat. Nos. 3,807,831; 3,994,568; and 4,299,444. Mirrors have also been utilized in association with nematic liquid crystals as set forth in U.S. Pat. Nos. 3,612,654; 4,202,607; 3,814,501; 3,614,210 and Japanese Pat. No. 30639 (1982).

Although photocells have been utilized in association with nematic liquid crystals, they generally always use polarizers as set forth in U.S. Pat. No. 4,200,361, Japanese Pat. Nos. 149902 and 156901. Other patents utilizing photocells or photosensors include U.S. Pat. Nos. 3,862,798; 4,005,928; 4,039,803; 3,772,685; German Publication Nos. 2416172 and 2808260. U.S. Pat. No. 4,005,928 utilizes a photocell in association with a light-scattering liquid crystal material.

U.S. Pat. No. 4,021,935 relates to a flight training hood having a bistable lens system operable to a state of transparency as the pilot views the control panel of his aircraft and instantaneously operable to a state of vision occlusion respective to the pilot switching his vision to outside of the aircraft.

Heretofore, liquid crystals utilized in association with polarizers have been the standard of the industry because of their generally good contrast, wide temperature range, quick response time, and fairly good stability. Naturally, a polarizer was necessary in order to yield a contrasting color.

Generally, dichroic dyes, although known, have heretofore been utilized for digital type displays. Examples of patents containing dichroic dyes and liquid crystals include U.S. Pat. Nos. 3,643,021; 3,846,014; 3,869,195; 4,093,356; 4,114,991; and 4,266,859. Due to their general lack of good contrast, and the like, dichroic dyes are generally not used in liquid crystal displays. Examples of various dichroic dye patents include U.S. Pat. Nos. 3,900,248; 3,960,751; 4,288,147 and 4,398,805.

DISCLOSURE OF INVENTION

It is therefore an aspect of the present invention to provide a light changeable mirror wherein a dichroic dye controls the amount of light reflected from said mirror.

It is a further aspect of the present invention to provide a light changeable dichroic mirror, as above, wherein said mirror is opened, that is, is transparent without the application of any electrical charge thereto.

It is a still further aspect of the present invention to provide a light changeable dichroic mirror, as above, wherein said mirror is free of polarizers and the like.

It is a still further aspect of the present invention to provide a light changeable dichroic mirror, as above, wherein said dichroic dye is a positive dye and said liquid crystal is a negative dielectric anisotropy material.

These and other aspects of the present invention will become apparent from the following specification which describes in detail the preferred embodiment of the present invention.

In general, an electro-optic, light changeable mirror, comprises: a transparent front member and a transparent back member; said front member having a conductive coating thereon and said back member having a conductive coating thereon; a nematic liquid crystal located between said front transparent member and said back transparent member, said liquid crystal having a negative dielectric anisotropy; a dichroic dye, said dichroic dye admixed in said liquid crystal; a reflective surface, said reflective surface located in back of said nematic liquid crystal; and a light sensitive photocell, said photocell connected to said front transparent conductive coating and to said back conductive coating.

Additionally, an electro-optic, light changeable mirror, comprising: a transparent front member and a transparent back member; said front member having a conductive coating thereon and said back member having a conductive coating thereon; a nematic liquid crystal located between said front transparent member and said back transparent member, said liquid crystal having a positive dielectric anisotropy; a dichroic dye, said dichroic dye admixed in said liquid crystal; a reflective surface, said reflective surface located in back of said nematic liquid crystal; and a light sensitive photocell, said photocell connected to said front transparent conductive coating and to said back conductive coating.

Additionally, a dichroic dye-nematic liquid crystal mirror, comprising: a mirror, said mirror having a controlled amount of light incident thereupon, liquid crystal being of a negative or positive dielectric anisotropy material; a front transparent conductive material and a back conductive material, said liquid crystal located between said front conductive and said back conductive material; said mirror having a reflective mirror surface, said reflective mirror surface located in back of said liquid crystal; the dichroic dye admixed in said liquid crystal in an amount of from about 0.01 to about 10 parts by weight per 100 parts by weight of said liquid crystal; a light sensitive photocell, said photocell connected to said front and said back conductive materials so that said photocell controls the amount of reflectivity therefrom.

BEST MODE FOR CARRYING OUT THE INVENTION

A dichroic dye contained in a liquid crystal light changeable mirror according to the present invention is generally indicated by the numeral 10. According to the present invention, two basic types of light changeable mirror constructions exist. One type is a normally dark mirror which lightens, that is reflects more light as an electrical charge is applied thereto. Such a mirror construction is often referred to as a closed mirror and has a negative image. The liquid crystal material therein is either a positive dielectric anisotropy material with a positive dichroic dye, or a negative dielectric anisotropy material with a negative dichroic dye therein. The other type of mirror construction is a normally light mirror, that is basically reflects all light being received thereby and, upon the application of an electrical charge thereto, darkens or reflects less light. This type of mirror is normally referred to as an opened mirror and has a positive image. The liquid crystal of the open type mirror is either a negative dielectric anisotropy material with a positive dichroic dye thereon, or a positive dielectric anisotropy material with a negative dichroic dye therein.

FIGS. 1 through 4 disclose four basic constructions of the two types of mirror constructions, that is opened or closed. Thus, FIGS. 1 and 2 relate to a closed mirror construction, having preferably a positive dielectric anisotropy material and a positive dichroic dye therein wherein the reflective surface is located on the back side of the liquid crystal material and contacts said material, FIG. 1, or is located spaced apart therefrom as by a glass or plastic layer, FIG. 2. Alternatively, this construction could also have a negative dielectric anisotropy material with a negative dichroic dye therein. Similarly, FIGS. 3 and 4 relate to an opened mirror construction, having preferably a negative dielectric anisotropy material with a positive dichroic dye therein, wherein the reflective surface is located on the back side of the liquid crystal material and contacts said material, FIG. 3, or is spaced apart therefrom as by a glass or plastic layer, FIG. 4. Alternatively, this construction could also have a positive anisotropy material with a negative dichroic dye therein.

Figure 1:
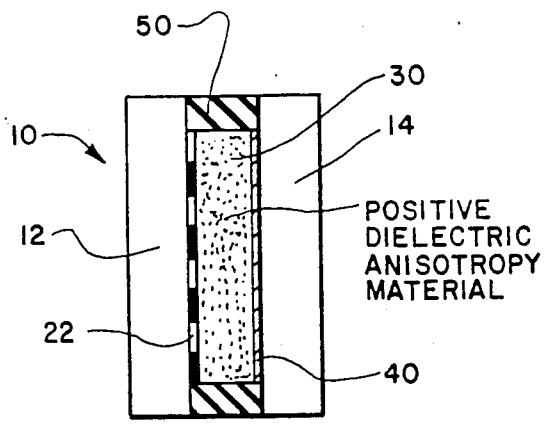
FIG. 1 relates to a cross-sectional view of an embodiment of a light changeable mirror having a positive dielectric anisotropy material.

Considering now the various embodiments of the present invention in greater detail, the specific embodiment of FIG. 1 utilizes a front or first transparent member 12. The front transparent member can be made out of any suitable material such as plastic, for example, polyacrylate, or glass, with glass being preferred. Back transparent member 14 exists at the rear of the article, in relationship to the direction of incident light, and is made out of the same type of material as front member 12, that is plastic or glass. A thin transparent electrical conductive coating 22 exists on the backside of front member 12 and is generally evenly distributed thereover. Such electrical coatings are well known to those skilled in the art and to the liquid crystal field and can be any conventional material as for example tin oxide or indium oxide. A typical thickness of said conductive coating 22 is from about 100 A to about 1,500 A, with from about 300 A to about 600 A being preferred, wherein A represents 1 angstrom unit. A high reflective mirror layer 40, exists on the front side of back member 14 and is desirably evenly distributed thereover. As well known to the art, mirrors are made of a highly reflective metallic material, usually chrome/silver. Hence, it is conductive and can be utilized in place of a transparent conductive coating. Located between front and back members 12 and 14, respectively, is liquid crystal material 30. Liquid crystal material 30 is of the nematic type. The embodiment of FIG. 1 utilizes a positive dielectric anisotropy material.

The liquid crystal material, be it either a negative or positive dielectric anisotropy material, can be any conventional or common liquid material known to the art. Accordingly, various phenylcyclohexanes, pyridazines, laterally substituted ethanes, phenyldioxanes, biphenyls, and the like, can be utilized. Examples of specific brands of liquid crystal materials include Chisso EN24, Hoffman LaRoche fluids such as Nr 2860, Nr 3085, and Nr 3086. Various nematic liquid crystals manufactured by E. Merck can also be utilized such as ZLI-1221, ZLI-1565, ZLI-1840, ZLI-1957/5 and ZLI-2584. Additionally, various nematic liquid crystal fluids manufactured by BDN can be utilized such as E70, E80, E8, E200, and E201. Whether such above nematic liquid crystals are positive or negative are readily known to the art. When a positive liquid crystal is utilized, those having a positive dielectric anisotropy of from about 2 to about 30 are desired, with from about 4 to about 25 being preferred. An example of a positive liquid crystal are the various phenylcyclohexanes such as Merck fluid ZLI-1565. When a negative liquid crystal material is utilized, desirably it has a negative dielectric anisotropy of from about minus 0.5 to about minus 10.6 and preferably from about minus 3 to about minus 7. Accordingly, various phenylcyclohexane ester mixtures can be utilized such as EN24 from Chisso. Moreover, specific negative liquid crystals can be utilized such as set forth in U.S. Pat. No. 4,281,903. A preferred type of liquid crystal material which is utilized in the present invention is set forth in U.S. Pat. No. 4,406,814, which is hereby fully incorporated by reference.

The light changeable mirror construction 10 of the present invention contains a small amount of dichroic dye in the liquid crystal. Generally, an amount of from about 0.01 to about 10 and preferably from about 0.1 to about 3.5 parts by weight based upon 100 parts by weight of liquid crystal is utilized. Any conventional or common type of dichroic dye can be utilized. Generally, such dyes are of an azo base type dye, an anthraquinone or naphthaquinone base type dye, or tetrazine type dye. Such dyes are well known to the art. Specific examples of such types of dichroic dyes are set forth in U.S. Pat. No. 4,406,814, which is hereby fully incorporated by reference. Examples of available azo dyes include G232, G205, G165, G168, discussed by Uchida. Sources of suitable anthraquinone dyes include Bayer and Mitsui. According to the present invention, the dyes desirably have a high optical order of parameter S of 0.6 or greater. Generally S is dependent upon the liquid crystal host material for both positive dyes whose optical absorption axis is nearly parallel to the molecular axis as in anthraquinone dye No. 4471-4 made by Bayer or azo dye G232 made by Uchida and for negative dyes whose light absorption axis is nearly perpendicular to the molecular axis as a tetrazine dye manufactured by Chisso.

Referring to FIG. 1, when a positive nematic liquid crystal is utilized, the dichroic dye is a positive dye. In this embodiment, when an electrical charge is applied to the nematic liquid crystal, the light absorption axis of the dichroic dye will become aligned with the parallel rays of incident light and thus liquid crystal material will become lighter or more transparent. Thus, FIG. 1 represents an embodiment in which an initial or normally closed mirror construction, that is negative image, becomes lighter upon the application of an electrical charge.

Figure 2:
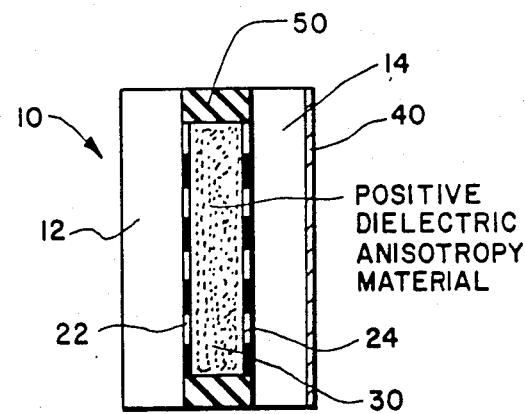
FIG. 2 relates to a cross-sectional view of another embodiment of a light changeable mirror having a positive dielectric anisotropy material.

Considering FIG. 2, this nematic liquid crystal mirror construction 10 is similar to FIG. 1 in that it has a front transparent member 12, a back transparent member 14, a front electrical conductive coating 22, and a positive dielectric anisotropy material as a liquid crystal with a positive dichroic dye therein, as explained above. However, in this embodiment, the reflective surface layer 40 constituting the mirror is located not on the front side of transparent member 14, but on the back side thereof. Accordingly, in order that a charge be imparted to the liquid crystal, this embodiment contains a back electrical conductive coating 24 located on the front side of back transparent member 14. Thus, the light incident rays which enter from the left side of the Fig. will pass through front member 12, liquid crystal 30, back member 14, then be reflected by reflective surface 40 back through back member 14, nematic liquid crystal 30 and front member 12.

Figure 3:
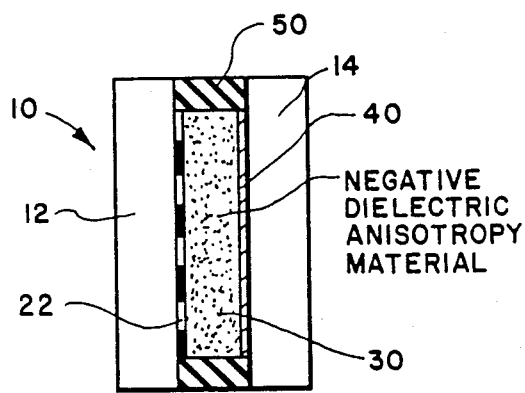
FIG. 3 relates to a cross-sectional view of an embodiment of a light changeable mirror having a negative dielectric anisotropy material.

Another embodiment of a nematic liquid crystal mirror construction of the present invention is shown in FIG. 3. In this embodiment, the reference numerals refer to the same types of materials as set forth in FIGS. 1 and 2. This embodiment also utilizes a front transparent member 12, a rear transparent member 14, a front electrical conductive coating 22, and a mirror reflective surface 40 located on the front side of back transparent member 14, as in FIG. 1. However, the nematic liquid crystal of this embodiment is a negative dielectric anisotropy material, and not positive as in FIGS. 1 and 2. Accordingly, a positive dichroic dye is utilized in the liquid crystal. Since a negative type liquid crystal material is utilized, mirror construction 10 is normally open, that is transparent but no charge is applied thereto and thus has a positive image. Upon the application of a charge, the mirror construction will become darker, thereby reflecting less light across the entire surface thereof. This embodiment accordingly is a preferred embodiment in that mirror construction is open or transparent and the reflective surface 40 is located on the front side of back member 14.

Figure 4:
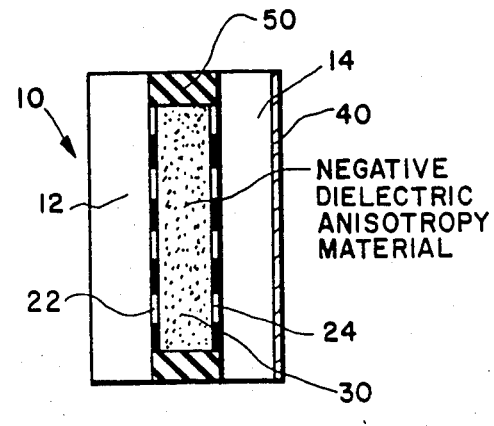
FIG. 4 relates to a cross-sectional view of another embodiment of a light changeable mirror having a negative dielectric anisotropy material.

A nematic liquid crystal mirror construction 10 of FIG. 4 is similar to FIG. 2 in having a front transparent member 12, a back transparent member 14, a front electrical conductive coating 22 located on the back side of front member 12, a back electrical conductive coating 24 located on the front side of back member 14, and a reflective surface 40 located on the back side of back member 14. However, as in FIG. 3, the nematic liquid crystal 30 contains a negative dielectric anisotropy material and accordingly has a positive dichroic dye therein. Thus, as in FIG. 3, nematic liquid crystal mirror construction 10 is normally open or transparent and will darken upon the application of a charge to nematic liquid crystal 30. The various members end layers are made of materials as described in FIGS. 1, 2 and 3.

Although the embodiments of FIGS. 1 through 4 show a reflective surface 40 which serves as a mirror, it is noted that such reflective surface can be the combination of a transparent member such as glass or plastic with the reflective surface coating 40 thereon being either on the back surface thereof, or preferably the front surface thereof. Thus, each of the embodiments shown in FIGS. 1 through 4 will contain an additional transparent member.

Figure 5:
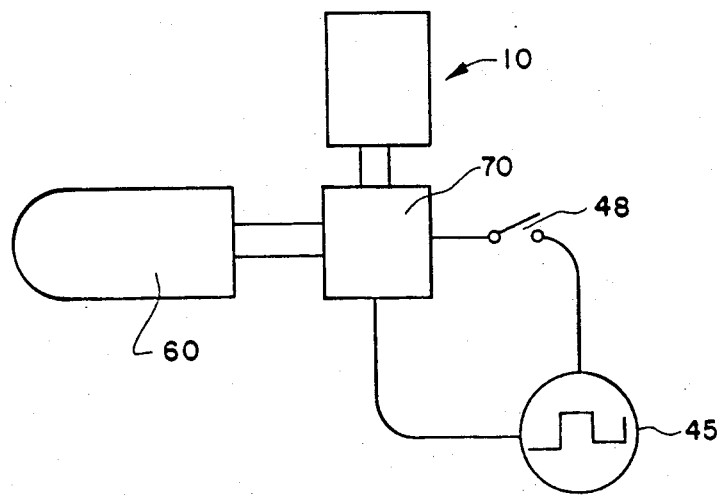
FIG. 5 relates to a schematic circuit diagram utilizing the light changeable mirror in connection with a photocell.

In accordance with the present invention, a photocell or light sensitive photo sensor is utilized in association with mirror construction 10 and can be mounted integrally therewith or separate therefrom but electrically attached thereto as shown in FIG. 5. Generally, any conventional type photocell, or more specifically a photo resistor or photo transistor, can be utilized such as Model VT801 containing cadmium selenide as manufactured by Vactec, Inc. Of course, the photo resistor can contain other chemical compounds such as cadmium sulfide. Photocell 60 preferably is of a resistance type such that as more light is received by the cell, the resistance therethrough decreases. In association with an optional switch 48 and a power source, usually of the alternating current type, although direct current, can also be used, indicated generally by the number 45, as more light is received by the cell, the resistance therethrough is diminished such that more current flows to conductive coatings 22 and 24 or 22 and 40. Upon the application of a current to the mirror assembly, the positive dichroic dye in the negative dielectric anisotropy material of FIGS. 3 and 4 generally is orientated 90 degrees such that its molecular axis is generally perpendicular to the incidence of the light rays. Typically, the greater the current or electrical potential, the greater the number of dichroic dye particles that are so orientated. Thus, there is generally a direct correlation between the amount of electrically aligned diparticles and the current applied to the conductive coatings. Hence, as a greater amount of light is received by photocell 60, the negative liquid crystal through the dichroic dye particles obscures or absorbs a greater amount of light and hence dims the mirror construction. As previously noted, this construction is preferred. Depending upon the light threshold required to trip or actuate photocell 60, optional switch 48 may be engaged or opened. The situation is the reverse for a positive liquid crystal containing a positive dichroic dye therein, as in FIGS. 1 and 2. That is, upon the application of a current, the dichroic dye is orientated so that an increased amount of light passes therethrough and the mirror construction is lightened.

Box 70 represents any conventional electronic circuitry which is utilized to connect photocell 60 with power source 45 and liquid crystal construction 10 to either dim or increase the amount of light reflected from the mirror construction. Such circuitry is conventional, can readily be designed and does not constitute a part of the present invention.

The entire perimeter or edge of the dichroic dye liquid crystal mixture of the present invention is enclosed by a seal 50 of generally any suitable material. Thus, an air tight bond is formed about the liquid crystal dichroic dye mixture.

According to the concepts of the present invention, nematic liquid crystal mirror construction 10 controls the amount of light emitted therefrom. That is, the amount of light reflected from the mirror is controlled through the utilization of a small electrical charge. When no charge is applied, relatively complete reflectivity exists due to the use of a positive dichroic dye and a negative anisotropy material utilized as the nematic crystal the preferred embodiment or the use of a negative dichroic and a positive anisotropy material. Hence, a fail-safe mirror is produced with respect to the preferred embodiment in that, should the circuitry break down or fail, the mirror is fully transparent. Alternatively, if desired, the use of a positive dye with a positive anisotropy material in the preferred embodiment or the use of negative dichroic dye with a negative anisotropy material will control the amount of transparency, although upon failure or shutting off of the power supply a dark or dimmed mirror is produced.

In either situation, since no polarized or twisted nematic liquid crystals are utilized, as commonly understood by the art, the mirror has good reflectivity; that is the light lost through the entire display or construction is less than 50 percent and usually less than 20 percent. This is in sharp contrast to polarized mirrors wherein approximately 50 percent of the light is lost, or where optical problems exist due to the utilization of polarizers, for example the creation of double images and the like, as well as unwanted optical effects such as bubbles, ripples, and general distortion throughout the mirror. In contrast thereto, the dichroic mirror of the present invention produces superior reflectivity even when the amount of light is reduced through the utilization of the photosensitive cell. Also, good contrast and definition is obtained therefrom and, as previously noted, in the preferred embodiment the mirror is opened, that is reflects any light received. Such properties were clearly unexpected in view of the prior types of mirrors utilized.

The mirror of the present invention can generally be utilized in any situation wherein conventional mirrors are utilized. For example, it may be used in the homes, in industry as in washrooms, and the like. A particularly suitable use is as a rearview mirror for an automobile. Due to the automatic dimmable features of the preferred embodiment, the driver of an automobile need no longer manually adjust his mirror from the lights of a near or approaching automobile or truck as at night. The mirror itself may be bracketed or packaged in any conventional housing, and the like. Moreover, front member 12 as well as rear member 14 may be of a safety glass type to prevent damage upon breakage.

The invention will be better understood by reference to the following examples.

EXAMPLE 1

An embodiment having the construction of FIG. 2 was made. A glass sheet having an indium oxide coating thereon was purchased and cut to size. Similarly, another glass sheet was purchased having a chrome coating thereon and cut to size. Each coated sheet could be washed with ultra pure water, then the front sheet was dip-coated with a 1 percent solution of polyvinyl alcohol (pva) in distilled water. The rear sheet was dip-coated with a 0.1 percent solution of lecithin in hexane. Then, the indium-tin-oxide-coated glass and the chrome-coated glass were gasketed. These sheets were baked in an 80° C. oven to prebake and level the gasket. The front glass with the (pva) coating was then buffed for homogeneous alignment. The two pieces of glass were then aligned and clamped on one side; and, then propping them open, the liquid crystal mixture as described below was introduced in between the two glass sheets. The display was clamped together, squeezing to remove air and then baked to seal the display. The approximate thickness of the liquid crystal between the two glass sheets was 8 microns.

The exact formulation of a 100 gram mixture was as follows:

| | |
|---|---|
| 98.7777 grams | Merck-1221 - phenylcyclohexane |
| .3000 | G165 (blue) - Mitsui-azo base dye |
| .0333 | G205 (orange) - Mitsui-azo base dye |
| .3000 | PB3 (pentaazo blue) - azo base dye |
| .15 | Bayer anthraquinone blue dye #4471-4 |
| .4390 | G232 (yellow) - Mitsui-azo base dye |
| 6.3830 | cholesterol oleate |

The structural formulas of these compounds are as follows:

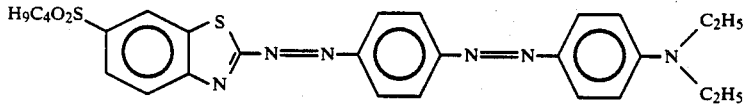
G165

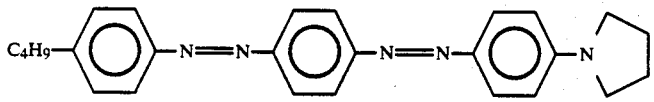
G205

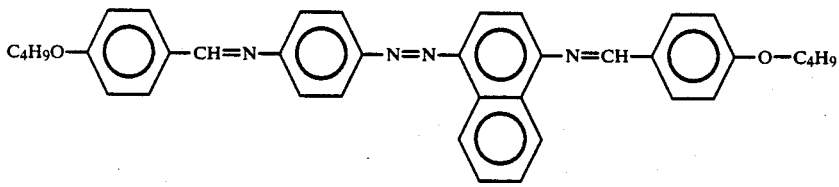
G232

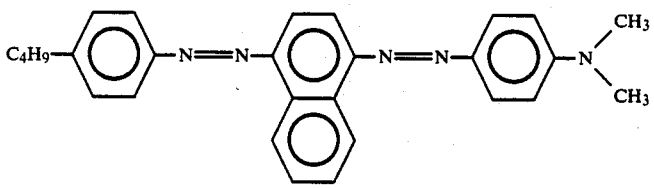
G239

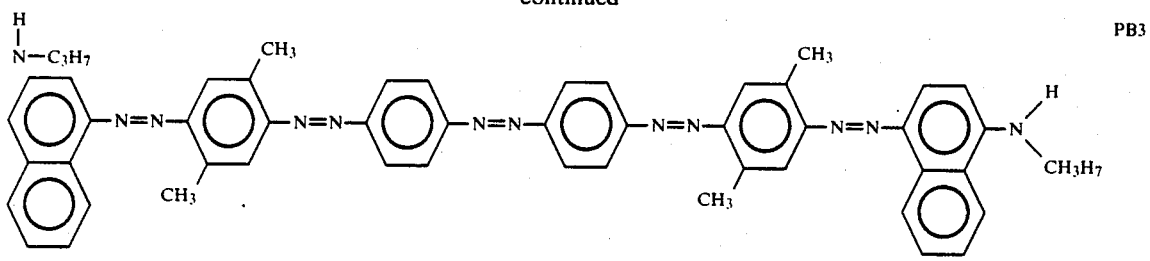

The display was then connected to an AC source and tested. The electrical source was connected to a cadmium selenide VT801 photo resistor manufactured by Victec, Inc. Upon the application of voltage thereto, for example approximately 30 volts, the mirror assembly exhibited an increase in the amount of light reflected. That is, when no voltage was applied, the amount of light reflected from the negative image, mirror construction was 73 candellas per square meter, whereas with the voltage applied, the reflection increased to approximately 270 candellas per square meter.

EXAMPLE 2

In a manner similar to Example 1, the embodiment of FIG. 1 can be prepared and will yield essentially the same results. The embodiment of FIG. 3 was made in a manner identical to Example 1, except that the 0.1 percent solution of lecithin was applied to both pieces of glass. Additionally, a negative dielectric anisotropy material was utilized containing a dichroic dye therein. The liquid crystal mixture was made from various liquid crystals and had the following formulation.

| COMPOUND | % BY PARTS |
|---|---|
| MeO—⌬—CO₂—⌬—C₅H₁₁ | 22.6 |
| MeO—⌬—CO₂—⌬—C₃H₇ | 11.2 |
| H₁₁C₅—⌬—CO₂—⌬—OEt | 13.5 |
| C₄H₉—⌬—CO₂—⌬—Me | 11.2 |
| MeO—⌬—CO₂—⌬—C₅H₁₁ | 9.0 |
| BuO—⌬—⌬—CH₃—CO₂—⌬—C₃H₇ | 11.2 |
| BuO—⌬—⌬—CH₃—CO₂—⌬—C₃C₇ | 11.2 |
| Et—O—⌬—CH₃—CO₂—⌬—C₃H₇ | 10.1 |

To 4 grams of the above mixture was added and dissolved therein 0.1412 grams of each of the following compounds:

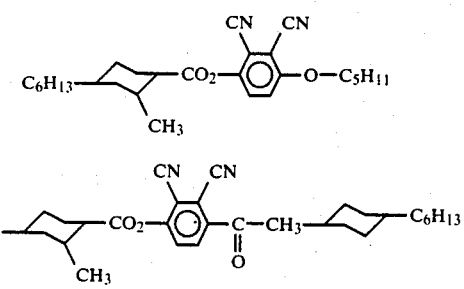

The overall mixture had a Cp of 68° to 69° C. This mixture was then heated with two grams of basic aluminum oxide at 90° C. for 10 minutes and filtered. This negative mixture had a viscosity of 78 cps at 19° C. (measured on a Weissenberg Rheogoneometer model #R17).

To 1.0 grams of this negative liquid crystal host material was added the following dichroic dyes:
0.0028 grams of PB3
0.0003 grams of Sudan Black B
0.0004 grams of Bayer anthraquinone blue dye #4471-4

A display was made as shown in FIG. 3 and was sealed in a manner as set forth in Example 1. The display was then connected to a power source as well as a photocell. An open display was produced and it had a positive image. The amount of light reflected with no voltage applied was approximately 629 candellas per square meter. When power was applied, the light reflected was approximately 487 candellas per square meter as the mirror darkened upon the photocell being subjected to a light source. Hence, an automatic dimmable mirror was produced.

An embodiment can be made as shown in FIG. 4 in a manner as described above with regard to Example 2.

From the above, it will be appreciated that an automatic dimmable mirror, as set forth in the embodiments of FIGS. 3 and 4 can readily be made or any other embodiment similar thereto. The essential feature is that the entire mirror is darkened upon exposure of the photocell to light. Of course, the circuitry of the setup is not a part of the invention and the threshold limit upon actuation of the photocell can be varied.

While in accordance with the patent statutes a best mode and preferred embodiment has been described in detail, it is to be understood that many variations thereof can be practiced without departing from the scope of the present invention which is measured by the scope of the attached claims.

What is claimed is:

1. An electro-optic, light changeable mirror, comprising:
    a transparent front member and a transparent back member;

said front member having a conductive coating thereon and said back member having a conductive coating thereon;

a nematic liquid crystal located between said front transparent member and said back transparent member, said liquid crystal having a negative dielectric anisotropy;

a dichroic dye, said dichroic dye admixed in said liquid crystal;

a reflective surface, said reflective surface located in back of said nematic liquid crystal; and a light sensitive photocell, said photocell connected to said front transparent conductive coating and to said back conductive coating.

2. An electro-optic, light dimmable mirror according to claim 1, wherein said front member has said conductive coating on the back side thereof, wherein said back member has said conductive coating on the front side thereof, and wherein said liquid crystal contacts said front transparent conductive coating and said back conductive coating.

3. An electro-optic, light dimmable mirror according to claim 2, wherein the amount of said dichroic dye is from about 0.01 to about 10 parts by weight per 100 parts by weight of said liquid crystal.

4. An electro-optic, light changeable mirror according to claim 3, wherein said dichroic dye is positive.

5. An electro-optic, light changeable mirror according to claim 4, wherein said mirror is free of light polarizers.

6. An electro-optic, light changeable mirror according to claim 5, whereupon said photo sensitive receiving a threshold of light incident thereon automatically reduces the amount of light reflected from said mirror.

7. An electro-optic, light changeable mirror according to claim 6, wherein said mirror is substantially reflective in the absence of any electrical current supplied to said coatings by said photocell and wherein said back conductive coating is said mirror reflective surface.

8. An electro-optic, light changeable mirror according to claim 7, wherein the amount of said dichroic dye ranges from about 0.1 to about 3.5 parts by weight per 100 parts by weight of said liquid crystal.

9. An electro-optic, light changeable mirror according to claim 3, wherein said negative liquid crystal is selected from the group consisting of phenylcyclohexane, and wherein said positive dichroic dye is selected from the group consisting of azo dyes, anthraquinone dyes, and combinations thereof.

10. An electro-optic, light changeable mirror, comprising:

a transparent front member and a transparent back member;

said front member having a conductive coating thereon and said back member having a conductive coating thereon;

a nematic liquid crystal located between said front transparent member and said back transparent member, said liquid crystal having a positive dielectric anisotropy;

a dichroic dye, said dichroic dye admixed in said liquid crystal;

a reflective surface, said reflective surface located in back of said nematic liquid crystal; and a light sensitive photocell, said photocell connected to said front transparent conductive coating and to said back conductive coating.

11. An electro-optic, light changeable mirror according to claim 10, wherein said front member has said conductive coating on the back side thereof, wherein said back member has said conductive coating on the front side thereof, wherein said liquid crystal contacts said front transparent conductive coating and said back conductive coating, and wherein the amount of said dichroic dye is from about 0.01 to about 10 parts by weight per 100 parts by weight of said liquid crystal.

12. An electro-optic, light changeable mirror according to claim 11, wherein said dichroic dye is positive and wherein said mirror is free of light polarizers.

13. An electro-optic, light changeable mirror according to claim 12, wherein said mirror has a low amount of reflectivity in the absence of any electrical current supplied to said coatings and wherein said back conductive coating is said mirror reflective surface.

14. An electro-optic, light changeable mirror according to claim 13, wherein the amount of said dichroic dye ranges from about 0.1 to about 3.5 parts by weight per 100 parts by weight of said liquid crystal.

15. A dichroic dye-nematic liquid crystal mirror, comprising:

a mirror, said mirror having a controlled amount of light incident thereupon, liquid crystal being of a negative or positive dielectric anisotropy material;

a front transparent conductive material and a back conductive material, said liquid crystal located between said front conductive and said back conductive material;

said mirror having a reflective mirror surface, said reflective mirror surface located in back of said liquid crystal;

the dichroic dye admixed in said liquid crystal in an amount of from about 0.01 to about 10 parts by weight per 100 parts by weight of said liquid crystal;

a light sensitive photocell, said photocell connected to said front and said back conductive materials so that said photocell controls the amount of reflectivity therefrom.

16. A dichroic dye-nematic liquid crystal mirror according to claim 15, wherein said mirror is free from any polarizers, and wherein said liquid crystal contacts said front and said back coating material.

17. A dichroic dye-nematic liquid crystal mirror according to claim 15, wherein said liquid crystal is a negative dielectric anisotropy material and said dye is a positive dichroic dye.

18. A dichroic dye-nematic liquid crystal mirror according to claim 17, wherein increased light intensity to said photocell decreases the amount of reflection.

19. A dichroic dye-nematic liquid crystal mirror according to claim 18, wherein the amount of said dichroic dye ranges from about 0.1 to about 3.5 parts by weight.

20. A dichroic dye-nematic liquid crystal mirror according to claim 19, wherein said reflective mirror surface is said back conductive coating.

* * * * *